(12) United States Patent
Close et al.

(10) Patent No.: US 10,741,980 B2
(45) Date of Patent: Aug. 11, 2020

(54) ILLUMINATED POWER RECEPTACLE

(71) Applicant: Hubbell Incorporated, Shelton, CT (US)

(72) Inventors: Patrick Close, East Haddam, CT (US); William Henry Dietz, Branford, CT (US); Thomas Louis Scanzillo, Monroe, CT (US); Ryan Gene Papageorge, Shelton, CT (US); Michael Arthur Salvietti, Northfield, CT (US); Jason Zachary Walker, Bethany, CT (US); Roy Itzler, Orange, CT (US)

( * ) Notice: Subject to any disclaimer, the term of this patent is extended or adjusted under 35 U.S.C. 154(b) by 0 days.

(21) Appl. No.: 16/547,661

(22) Filed: Aug. 22, 2019

(65) Prior Publication Data

US 2020/0067240 A1    Feb. 27, 2020

Related U.S. Application Data

(60) Provisional application No. 62/801,300, filed on Feb. 5, 2019, provisional application No. 62/721,337, filed on Aug. 22, 2018.

(51) Int. Cl.
*H01R 13/44* (2006.01)
*H01R 13/717* (2006.01)
(Continued)

(52) U.S. Cl.
CPC ..... *H01R 13/7175* (2013.01); *H01R 13/5213* (2013.01); *H01R 13/6683* (2013.01); *H01R 25/006* (2013.01)

(58) Field of Classification Search
CPC .............. H01R 13/4534; H01R 13/447; H01R 13/465; H01R 25/006; H01R 23/025
(Continued)

(56) References Cited

U.S. PATENT DOCUMENTS 2,612,597 A   9/1952  Sherrard
4,293,173 A  10/1981  Tricca
(Continued)

OTHER PUBLICATIONS

International Search Report and Written Opinion, dated Nov. 15, 2019, received in International Patent Application No. PCT/US19/476006, 15 pages.
(Continued)

*Primary Examiner* — Phuong Chi Thi Nguyen
(74) *Attorney, Agent, or Firm* — Verrill; John W. Powell

(57) ABSTRACT

An illuminated power receptacle includes a base having at least one set of contacts for receiving a plug. Each set of contacts having at least two openings for receiving a respective prong of a plug. There is a cover mounted on the base with an outlet member corresponding to each set of contacts. Each outlet member includes an outlet face with an opaque material and an outer periphery. Each outlet face includes at least two openings configured to receive and guide a respective prong of the plug into the set of at least two openings of the corresponding set of contacts. Each outlet member also includes an outlet rim made of a translucent material disposed about the outer periphery of the outlet face. There is light source disposed between the base and the cover that transmits light that passes through each outlet rim and is blocked by the opaque material.

34 Claims, 15 Drawing Sheets

(51) Int. Cl.
  *H01R 13/52* (2006.01)
  *H01R 25/00* (2006.01)
  *H01R 13/66* (2006.01)

(58) Field of Classification Search
  USPC ........ 439/145, 491, 136, 535, 536, 538, 539
  See application file for complete search history.

(56) References Cited

U.S. PATENT DOCUMENTS

| | | | |
|---|---|---|---|
| 5,902,140 A | 5/1999 | Cheung et al. | |
| 6,991,495 B1 | 1/2006 | Aromin | |
| 7,036,948 B1 | 5/2006 | Wyatt | |
| 7,391,939 B1 | 6/2008 | Williams | |
| 7,511,231 B2 | 3/2009 | Drane | |
| 7,736,174 B2 | 6/2010 | Bhosale et al. | |
| 7,938,676 B1 * | 5/2011 | Patel | H01R 25/006 |
| | | | 439/489 |
| 8,182,279 B2 * | 5/2012 | Reusche | H01R 13/5219 |
| | | | 174/67 |
| 8,371,881 B2 * | 2/2013 | Zhou | H01R 25/003 |
| | | | 439/272 |
| 9,112,321 B2 | 8/2015 | Bhosale et al. | |
| 9,496,695 B2 * | 11/2016 | Battaglia | H02G 3/14 |
| 9,575,587 B2 | 2/2017 | O'Keeffe | |
| 9,666,975 B1 * | 5/2017 | Baldwin | H01R 13/5202 |
| 9,941,644 B1 | 4/2018 | Liu et al. | |
| 2012/0115372 A1 * | 5/2012 | Bazayev | H01R 13/41 |
| | | | 439/733.1 |

OTHER PUBLICATIONS

"Hubbell 2172LALTRA HUB-PRO HG DECO 15A/125V LED TR LA"; retrieved from Internet on Jan. 8, 2020: https://www.westwayelectricsupply.com/hubbell-2172laltra-hub-pro-hg-deco-15a-125v-led-tr-la.html?Calida=EAlalQobChMlnLbVpry95gIVI4rlCh07jwjLEAQYASABEgLHQ_D_BwE.

"Leviton MT162-ILR LEVLOK 20 HG TR IL DEC"; retrieved from Internet on Jan. 8, 2020: https://www.walmart.com/ip/Leviton-MT162-ILR-LEVLOK-20-HG-TR-IL-DEC/808138677.

\* cited by examiner

ILLUMINATED POWER RECEPTACLE

CROSS-REFERENCE TO RELATED APPLICATIONS

This application claims priority to U.S. Provisional Application No. 62/721,337, filed Aug. 22, 2018, entitled "ILLUMINATED POWER RECEPTACLE," and to U.S. Provisional Application No. 62/801,300, filed Feb. 5, 2019, entitled "ILLUMINATED POWER RECEPTACLE," both of which are incorporated herein by reference in their entirety.

FIELD OF THE INVENTION

This invention relates to an illuminated power receptacle and more specifically to such an illuminated power receptacle, which is more conspicuously lit to allow users to quickly and easily locate the receptacle.

BACKGROUND OF THE INVENTION

Electrical power receptacles used in hospitals, for example, may include an indicator that identifies the receptacle as being a hospital grade device. Such receptacles may be used in emergency circuits that are powered by a back-up power source (e.g. a generator) in the event of a power outage. In prior art devices, the indicator has been a colored window formed on the face of the receptacle such that it is readily visible. A light emitting source, such as a light emitting diode located behind the window and coupled across the contacts of the receptacle has been used to provide a positive indication (illumination) that the receptacle is connected to a live circuit. In hospitals, this is critical especially during a power outage when back-up power generation is activated and only certain circuits are powered. In this way hospital personnel can quickly determine which receptacles are powered so that patient equipment, in particular life critical equipment, can be readily plugged in to live receptacles to expeditiously continue to provide patient treatment.

While existing illuminated receptacles provide a benefit, they are not as readily visible as desired and there exists a need for an improved illuminated power receptacle.

BRIEF DESCRIPTION OF THE INVENTION

In one aspect, the invention features an illuminated power receptacle including a receptacle base configured to be received within an electrical box. The receptacle base includes electrically conductive terminals for receiving electrical power from a power source and at least one set of receptacle contacts connected to the electrically conductive terminals for receiving a plug to electrically connect to the power source. Each set of receptacle contacts having at least two openings for receiving a respective prong of said plug. There is a receptacle cover mounted on the receptacle base and including an outlet member corresponding to each of the at least one set of receptacle contacts. Each outlet member including an outlet face comprising an opaque material and having an outer periphery. Each outlet face also includes at least two openings aligned with the at least two openings of the corresponding set of receptacle contacts and the at least two openings in each outlet face are configured to receive and guide a respective prong of said plug into the set of at least two openings of the corresponding set of receptacle contacts. Each outlet member further includes an outlet rim made of a translucent material and disposed about the outer periphery of the outlet face. There is a light source disposed between the receptacle base and the receptacle cover and operatively coupled to said electrical power source for generating light directed at each outlet member. The light is transmitted through each outlet rim out of the illuminated power receptacle while the light transmitted toward each outlet face is substantially blocked by the opaque material.

In other aspects of the invention, one or more of the following features may be included. The opaque material of the outlet face may include an opaque insert affixed to the outlet face. The opaque material comprises an opaque film disposed on the outlet face. Each outlet face may be formed of an opaque material. There may further be included a receptacle spacer disposed between the receptacle base and the receptacle cover and the light source may be disposed on the receptacle spacer. At least a portion of the receptacle spacer proximate each outlet member may be formed of a translucent material and the light source may be directed into the portion of the receptacle spacer formed of translucent material to illuminate the translucent material of the receptacle spacer and to couple the light illuminating the receptacle spacer to each outlet member. The portion of the receptacle spacer formed of translucent material proximate each outlet member may include a first surface substantially parallel to a surface of each outlet member and the portion of the receptacle spacer formed of translucent material may include a second surface substantially orthogonal to the first surface. The light source may comprise at least one light emitting diode directed into the second surface of the portion of the receptacle spacer formed of translucent material. The light emitting diode may be mounted on a printed circuit board (PCB) disposed on the receptacle spacer.

In other aspects of the invention, one or more of the following features may be included. For each outlet member, the outlet rim may be disposed entirely about the outer periphery of the outlet face. A surface of the opaque material may be substantially flush with the outlet rim and the opaque material may occupy substantially all of the outlet face, excluding the at least two openings. The opaque material may include an indicia to indicate an application for the illuminated power receptacle. The indicia may include a color for the opaque material. There may be a detector for detecting a condition of the receptacle and a device to alter the light transmitted from the output source based on the detected condition. The device may alter the light transmitted based on the detected condition causes the light to be altered by one of causing it to change color or to be intermittently illuminated. The detected condition may be a ground fault. The light source may include a layer of fiber cladding disposed on a back surface of the receptacle cover. The receptacle cover and the receptacle spacer may comprise one of a polycarbonate material, thermoplastic material or a Sabic resin. The receptacle cover may include a back surface having texture to diffuse the light transmitted from the light source. The receptacle spacer may include a tamper resistant (TR) mechanism for each outlet member. The light source may comprise a light emitting diode associated with each outlet member and each light emitting diode may be oriented to direct light through an opening in the TR mechanism corresponding to the outlet member associated with the light emitting diode. Each TR mechanism may be formed of one of a translucent, semi-translucent, or opaque material. There may further be included an opaque insulating layer overlying the receptacle spacer and covering the light emitting diodes and an opaque spacer layer disposed on each outlet face below the opaque insert.

In yet other aspects of the invention, one or more of the following features may be included. Each opaque insert may include a bezel member protruding from a back surface and each outlet face includes an aperture through which the bezel member is inserted to secure the opaque insert to the outlet face. Each bezel member may include a protrusion affixed at a first end to the back surface of the opaque insert and at least one tab member at a second end of the protrusion and extending out from a periphery of the protrusion and wherein each aperture may include at least one opening about its periphery shaped to conform to the shape of the at least one tab member to allow the at least one tab member to pass through the aperture when the bezel member is inserted through the aperture at first rotational position about an axis of the aperture. Each outlet face may include a back surface with at least one pocket for securing the at least one tab member when each opaque insert member has been inserted through the aperture and rotated to a second rotational position about the axis of the aperture, preventing the at least one tab member from being retracted through the aperture. The second end of the protrusion of each bezel member may include an opening configured to receive a protrusion at a first end of a complementary bezel member when the protrusion of the complementary bezel member is inserted in the opening and wherein the complementary bezel member may include at a second end at least one tab member configured to be received in the at least one pocket. Each bezel member may be adhered to the complementary bezel member and to the receptacle cover. Each bezel member may be adhered to the complementary bezel member and to the receptacle cover using ultrasonic welding. Each bezel member and each complementary bezel member may comprise one of a polycarbonate material, a thermoplastic material, or a Sabic resin. The protrusion of each bezel member may be cylindrical in shape and the at least one tab member may be triangular in shape and wherein the aperture may be cylindrical in shape and the at least one opening about the periphery of the cylindrical aperture may be triangular in shape.

Another aspect the invention features a system for an illuminated power receptacle having a receptacle base configured to be received within an electrical box. The receptacle base including electrically conductive terminals for receiving electrical power from a power source and at least one set of receptacle contacts connected to the electrically conductive terminals for receiving a plug to electrically connect to the power source. Each set of receptacle contacts having at least two openings for receiving a respective prong of said plug. There is a receptacle cover mounted on the receptacle base and including an outlet member corresponding to each of the at least one set of receptacle contacts. Each outlet member is made of a translucent material and includes an outlet face and an outlet rim disposed about and projecting from the outlet face. Each outlet face includes at least two openings aligned with the at least two openings of the corresponding set of receptacle contacts. The at least two openings in each outlet face are configured to receive and guide a respective prong of said plug into the set of at least two openings of the corresponding set of receptacle contacts. There is an opaque insert disposed on the outlet face and adjacent the outlet rim of each outlet member. Each opaque insert includes at least two openings aligned with the at least two openings of a corresponding outlet member. There is a light source disposed between the receptacle base and the receptacle cover and operatively coupled to said electrical power source for generating light directed at each outlet member. The light is transmitted through each outlet rim out of the illuminated power receptacle while the light transmitted through each outlet face in a region of the opaque insert is substantially blocked.

In a further aspect, the invention there is illuminated power receptacle including a receptacle base configured to be received within an electrical box. The receptacle base including electrically conductive terminals for receiving electrical power from a power source and at least one set of receptacle contacts connected to the electrically conductive terminals for receiving a plug to electrically connect to the power source. Each set of receptacle contacts having at least two openings for receiving a respective prong of said plug. There is a receptacle cover mounted on the receptacle base and including an outlet member corresponding to each of the at least one set of receptacle contacts. Each outlet member being formed of an opaque material and including an outlet face having an outer periphery. Each outlet face includes at least two openings aligned with the at least two openings of the corresponding set of receptacle contacts. The at least two openings in each outlet face are configured to receive and guide a respective prong of the plug into the set of at least two openings of the corresponding set of receptacle contacts. Each outlet member further includes an outlet rim made of a translucent material and disposed about the periphery of the outlet face. There is a light source disposed between the receptacle base and the receptacle cover and operatively coupled to said electrical power source for generating light directed at each outlet member. The light is transmitted through each outlet rim out of the illuminated power receptacle while the light transmitted toward each outlet face is substantially blocked by the opaque material.

BRIEF DESCRIPTION OF THE FIGURES

Embodiments of the present disclosure will now be described, by way of example only, with reference to the attached Figures, wherein.

DETAILED DESCRIPTION OF THE INVENTION

Figure 1:
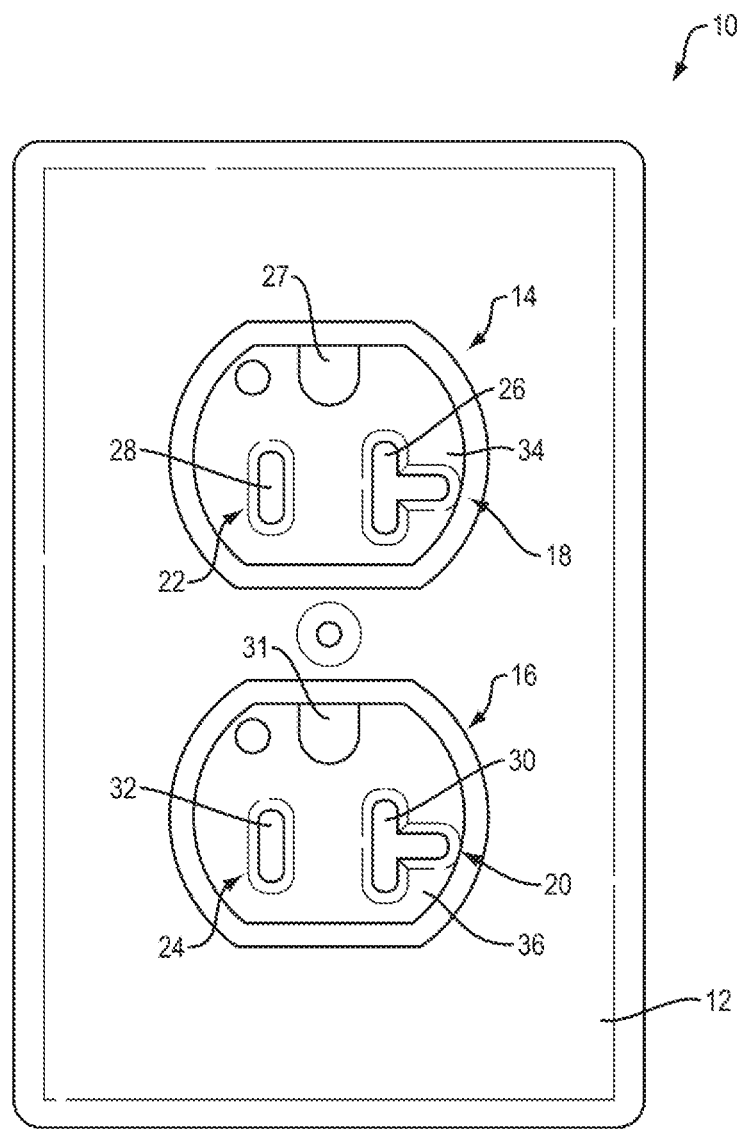
FIG. 1 shows a perspective view of an embodiment of an illuminated power receptacle including a cover plate, according to an aspect of this invention.

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments, as the skilled artisan would recognize, even if not explicitly stated herein.

Descriptions of well-known components and processing techniques may be omitted to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

An illuminated power receptacle 10, according to an aspect of this disclosure, is depicted in FIG. 1 with a cover plate 12. In this embodiment, receptacle 10 is a duplex receptacle, meaning that it includes two outlet members 14 and 16 for receiving the prongs of a plug of a piece of equipment to be powered. The outlet members 14 and 16 include translucent rims 18 and 20, respectively, which surround the peripheries of outlet faces 22 and 24 (not visible), respectively. The rims 18 and 20 are lighted by LED lighting, as described below. While this embodiment is a duplex receptacle, it will be understood that the invention is equally applicable to receptacles with one outlet member or more than two outlet members.

The LED lighting may also illuminate the openings 26 and 28 of outlet member 14, which are configured to receive the "hot" and "neutral" prongs of a plug to guide them into contact with the respective contacts of the receptacle powered by the electrical source within the building. Openings 30 and 32 of outlet member 16 may also be illuminated by the LED lighting and are configured to receive the "hot" and "neutral" prongs of a plug to guide them into contact with the contacts of the receptacle. Openings 27 and 31 of outlet members 14 and 16, respectively, are configured to receive the "ground" prongs of a plug and to guide them into contact with the ground contacts of the receptacle and they too may be illuminated by the LED lighting.

As will be described in more detail below, each outlet member may also include an opaque insert member (i.e. 34 and 36) which may be affixed to the outlet face (i.e. 22 and 24) by, for example, ultrasonic welding. Insert members 34 and 36 may be made of an opaque material, such as polyoxymethylene ("POM"). The opaque insert members substantially block the LED light and thus do not allow the outlet faces to be illuminated. Therefore, the illuminated power receptacle provides a very nice lighted effect, with only the rims around the peripheries of the outlet members lighted, as well as the openings for the plug prongs. This makes the receptacle quite easy to locate as well as making it easy to insert the prongs properly into the openings.

Figure 2A:
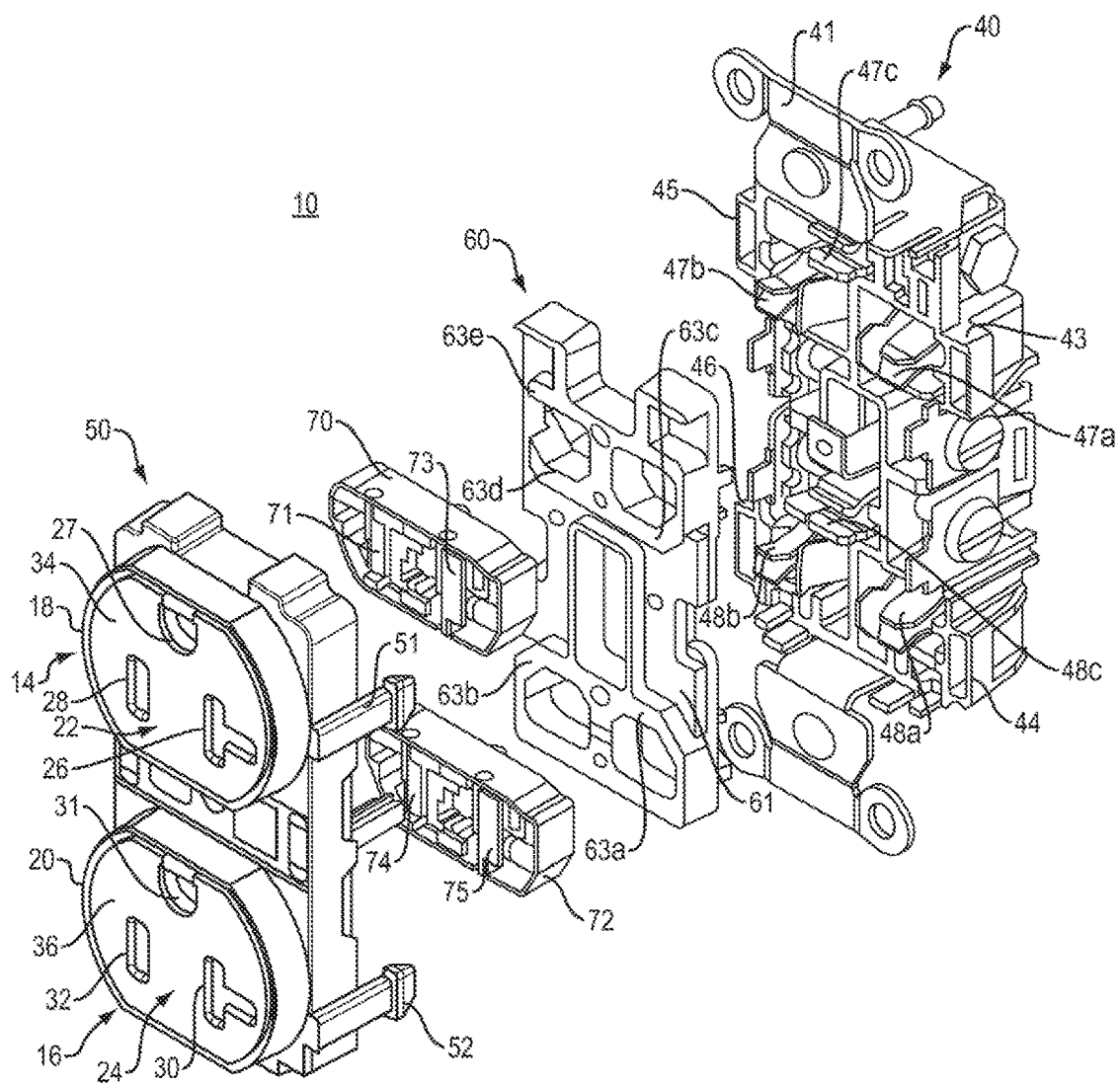
FIG. 2A shows an exploded perspective view of the illuminated power receptacle of FIG. 1.

The detailed construction of receptacle 10 can be seen in an exploded view in FIG. 2A. Receptacle 10 may include a receptacle base 40 configured to be received within an electrical box (not shown) mounted to the framing within the building and connected thereto by yokes 41 and 42. Receptacle cover 50 includes outlet members 14 and 16, and sandwiched between receptacle cover 50 and receptacle base 40 may be a receptacle spacer 60. In this embodiment, the entire receptacle cover 50 and the entire receptacle spacer 60 may be fabricated from a translucent material, such as a clear polycarbonate material.

Receptacle 10 may be optionally configured as a tamper resistant ("TR") receptacle, in which case TR mechanisms 70 and 72, one for each outlet member 14 and 16 of receptacle cover would be included. The design and operation of such TR mechanisms is well known in the art. When receptacle 10 is assembled, TR mechanisms 70 and 72 will be disposed beneath openings 26-28 and 30-32 of outlet members 14 and 16 and held in place sandwiched between the underside of receptacle cover 50 and receptacle insert 60 when receptacle insert 60 is snap fit into the underside of receptacle cover 50. TR mechanism 70 includes a pair of shutters or sliders 71 and 73 and TR mechanism 72 includes a pair of shutters or sliders 74 and 75 to prevent or permit insertion of prongs of a plug, as is known in the art. The TR mechanisms 70 and 72 may be made of a translucent or semi-translucent material to allow some light from the LED lighting (as described in FIG. 1) to pass though openings 26 and 28 of outlet member 14 and openings 30 and 32 of outlet member 16. Alternatively, TR mechanisms 70 and 72 may be made of an opaque material, such as polyoxymethylene ("POM") to prevent light from the LED lighting from passing though openings 26/28 and 30/32.

The combination of receptacle cover 50 with insert 60 snap fit into it are connected to receptacle base 40 by means of legs 51 and 52 (having wedged feet) along one side receptacle cover 50 engaging with and interconnecting to recesses 43 and 44, respectively, disposed along one side of receptacle base 40. Receptacle base 40 includes two additional legs (not shown in this view) along the other side receptacle cover 50 which engage with and interconnect to recesses 45 and 46 disposed along the other side of receptacle base 40.

Receptacle base 40 is of a type well known in the art and it includes electrically conductive terminals 47a-c for receiving electrical power from a power source within the building. Contacts 47a and 47b are aligned with openings 26 and 28 of outlet member 14 in receptacle cover 50 for receiving the "hot" and "neutral" prongs of a plug and terminal 47c is aligned with opening 27 of outlet member 14 in receptacle cover 50 for receiving the ground prong of the plug, so that the plug can be electrically connected to the power source. Similarly contacts 48a and 48b are aligned with openings 30 and 32 of outlet member 16 in receptacle cover 50 for receiving the "hot" and "neutral" prongs of a plug and terminal 48c is aligned with opening 31 of outlet member 16 in receptacle cover 50 for receiving the ground prong of the plug, so that the plug can be electrically connected to the power source.

Figure 3:
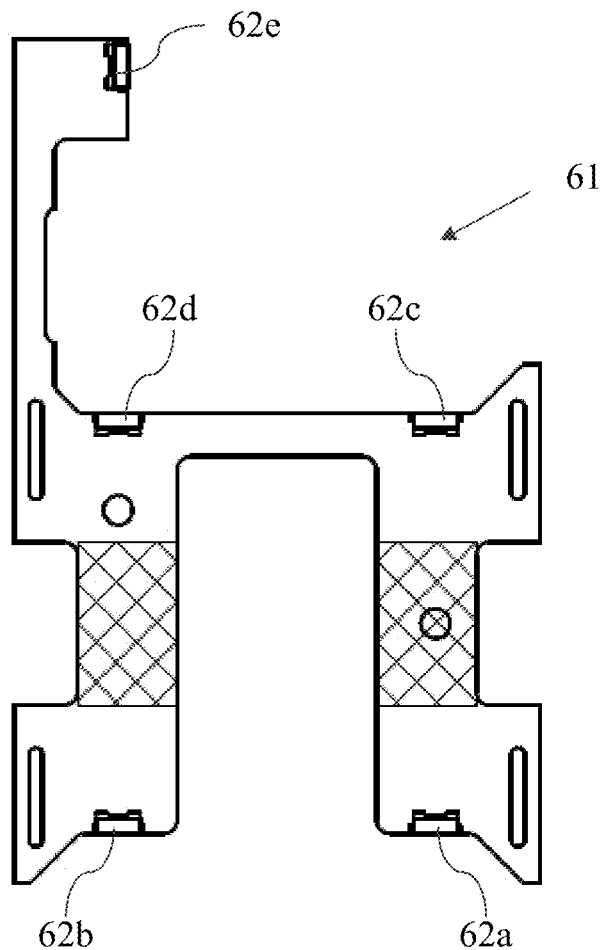
FIG. 3 shows a top plan view of a printed circuit board of the receptacle spacer shown in FIG. 2.

Receptacle spacer 60 may include a printed circuit board (PCB) 61 disposed on a surface thereof on a side that faces the underside of receptacle cover 50 when the receptacle 10 is assembled. Referring to FIG. 3, PCB 61 is shown to include several side-fired LED's 62a-62e arranged to emit light into the translucent material of the receptacle spacer 60 to illuminate receptacle spacer 60. Alternatively, surface mount or leaded through-hole LEDs may be used. In this embodiment, side-fired LED's 62a-e are directed into regions 63a-e, respectively, as shown in FIG. 2A. These regions may each include a first surface substantially parallel to the faces of each outlet member and a second surface substantially orthogonal to the first surface. The LEDs may emit light into the second surfaces of the regions 63a-e. In addition, regions 63a-63e of receptacle spacer 60 may be aligned with outlet members 14 and 16 of receptacle cover 50 such that when the regions of receptacle spacer 60 are illuminated, the light will be coupled into the translucent material from the underside of the receptacle cover 50 causing it to be illuminated. The under surface of the receptacle cover 50 may be provided with a texture to prevent reflection of the light from the LED and to diffuse the light throughout the receptacle cover. The texture may be fine or micro texture that may produce a matte finish.

It will be understood that the number, location, and orientation of the LED's will be application dependent and will vary based on LED power, materials used, and desired light output, for example. It will also be understood that the receptacle spacer 60 and receptacle cover 50 do not have to be constructed completely of translucent material. As long as the regions of the receptacle spacer 60 and receptacle cover 50 are in the vicinity of the outlet members are translucent, then the remaining portions need not be translucent.

Figure 2B:
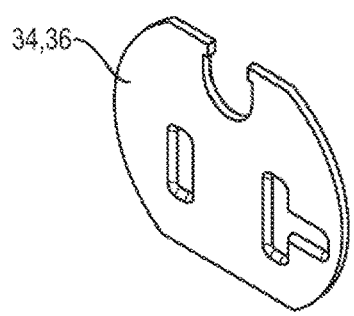
FIG. 2B shows a perspective view of the opaque insert member of FIGS. 1 and 2.
Figure 4:
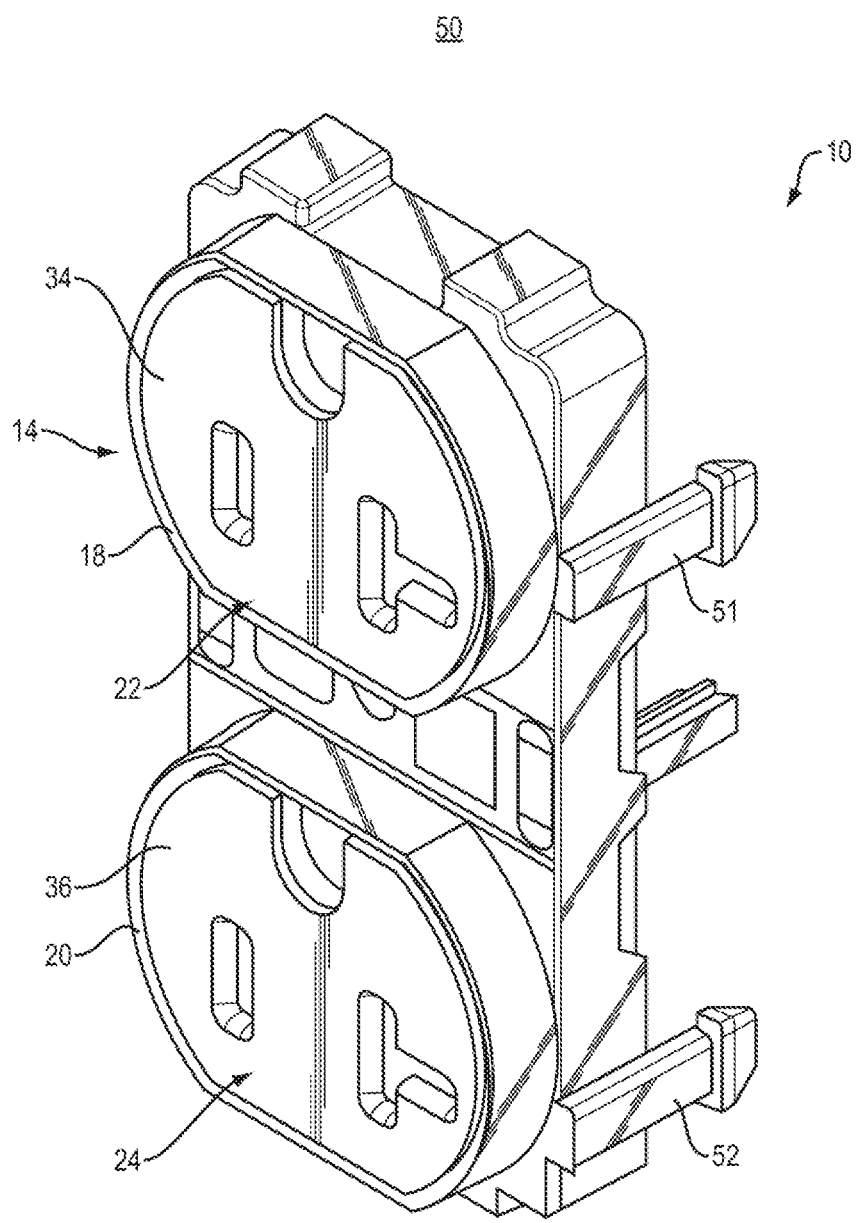
FIG. 4 shows an enlarged perspective view of the receptacle cover shown in FIG. 2.

Referring to FIG. 2A, as well as FIG. 4 (enlarged view), receptacle cover 50 will be described in more detail. Outlet members 14 and 16 include translucent rims 18 and 20, which surround the peripheries of outlet faces 22 and 24. While rims 18 and 20 completely surround peripheries of outlet faces 22 and 24 in this embodiment it is not a requirement and the rims may only partially surround the outlet faces. Opaque inserts 34 and 36 may be disposed on outlet faces 22 and 24 (not visible due to the inserts) and the outer surfaces of the opaque inserts may be substantially flush with the top edges of the outlet rims 18 and 20. The outer surfaces of opaque inserts 34 and 36 do not need to be flush with the top edges of the outlet rims 18 and 20 and may be located above or below the top edges. Opaque insert 34/36 is depicted in FIG. 2B separated from the outlet face. The insert may be relatively thin, e.g. 0.05 in., and may include a back surface with a chamfered edge to more easily install it on an outlet face surrounded by an outlet rim.

As shown, the opaque inserts 32 and 34 occupy substantially all of outlet face 34 and 36 (excluding the openings for the prongs of the plugs); however, they may occupy only a portion of the outlet faces. The opaque insert may be color coded to indicate a particular application for receptacle 10. For example, the opaque inserts in this embodiment are colored red to indicate that the receptacle is connected to an emergency back-up circuit. This color-coding may be used in hospitals, for example, so that staff will know the location of energized receptacles during a power outage. Of course, inserts of other colors may be used for other applications and different indicia may be included other than color, such as lettering, numbering, or symbols to indicate an application for the illuminated power receptacle.

As an alternative to using inserts 34/36 in FIG. 2B, outlet faces 22 and 24 may be covered with an opaque film (e.g. paint), which may be red in color. The opaque film will perform the same function as the inserts and will block the LED light from illuminating the outlet faces.

Figure 5:
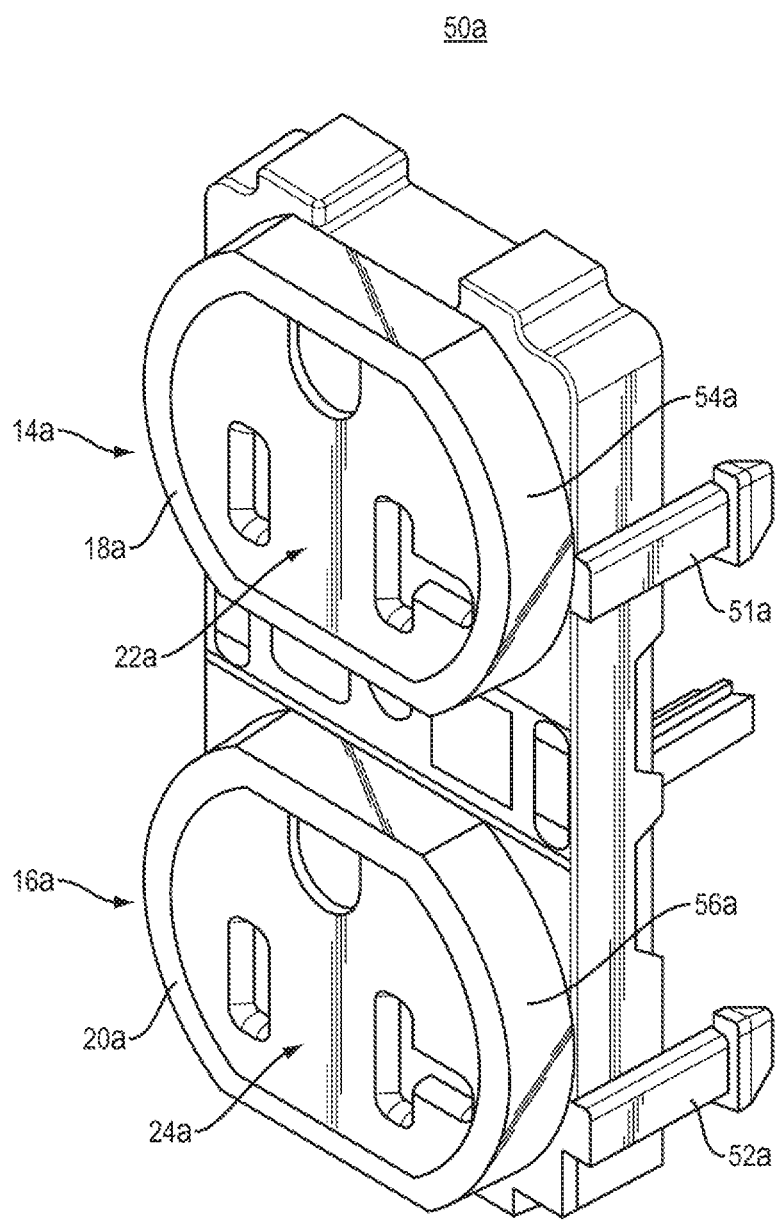
FIG. 5 shows an enlarged perspective view of an alternative embodiment of the receptacle cover shown in FIGS. 2 and 4.

In another embodiment, as shown in FIG. 5, receptacle cover 50a may be formed of an opaque polycarbonate or thermoplastic material. In this example, the opaque polycarbonate or thermoplastic material may be red in color and therefore no opaque insert would be required as the outlet faces 22a and 24a are themselves already opaque and colored red. This is in contrast to the embodiment of FIGS. 1, 2, and 4, where the outlet faces 22 and 24 are translucent and are covered by separate opaque inserts 34 and 36. Alternatively, receptacle cover 50a may be formed of a translucent polycarbonate or thermoplastic material and the outlet faces 22a and 24a may be covered with an opaque film (e.g. paint) which may be red in color. In either case, surrounding outlet faces 22a and 24a may be rim inserts 18a and 20a, respectively. Rim inserts 18a and 20a may be formed as separate pieces of translucent material (e.g. polycarbonate or thermoplastic) configured to snap fit around the periphery of the outlet faces. When the receptacle cover 50a is used with receptacle base 40 and receptacle spacer 60, the LED lights illuminating the receptacle spacer 60, as described above, are blocked by the opaque receptacle cover 50a but the translucent rims 18a and 20a are illuminated via apertures in outlet members 14a and 16a (e.g. aperture 54 in outlet member 14a and aperture 56 in outlet member 16a). Therefore, the illuminated power receptacle with receptacle cover 50a will also provide a very nice lighted effect, with only the rims around the peripheries of the outlet members lighted as well as the openings for the prongs.

Figure 6:
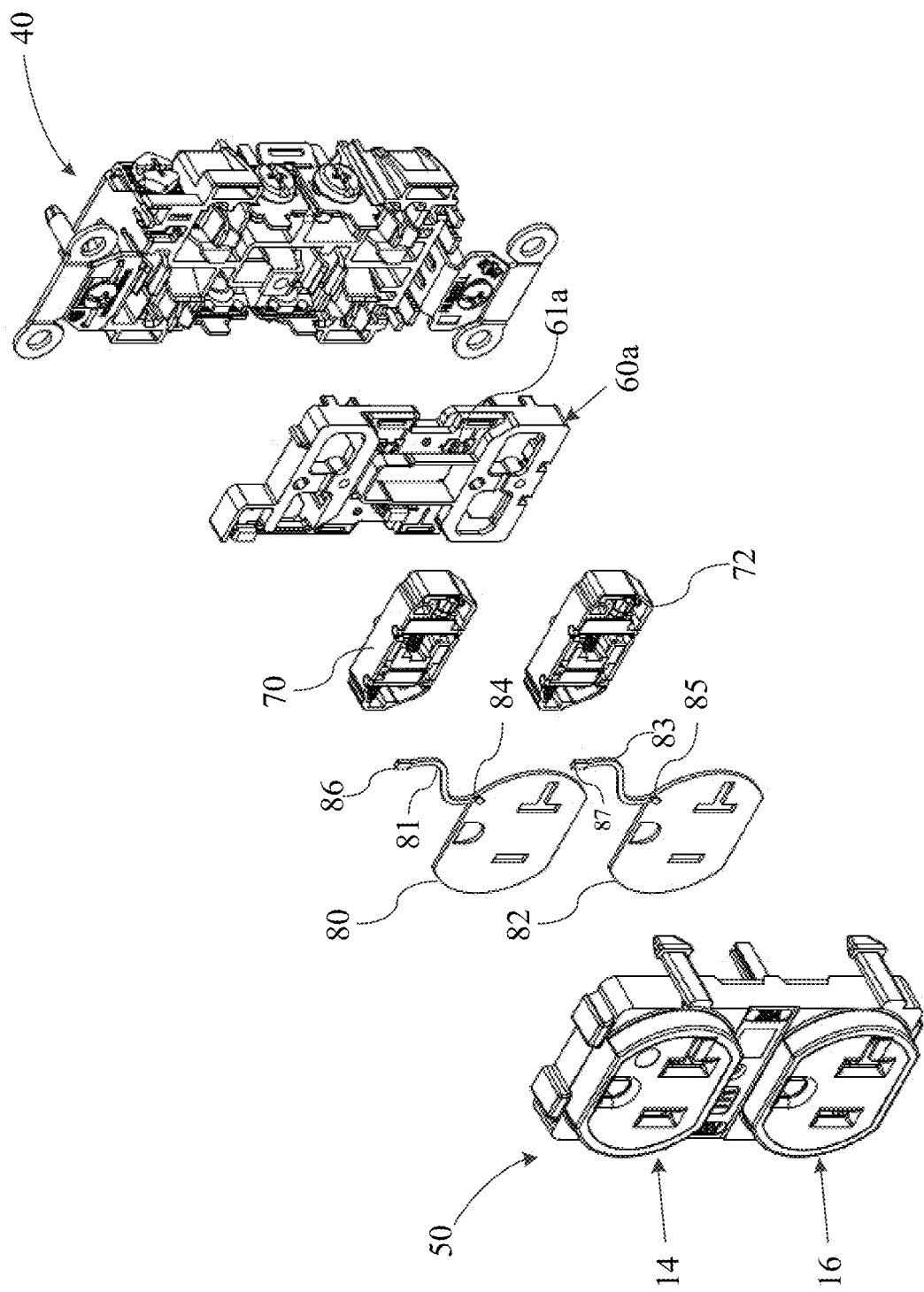
FIG. 6 shows a perspective view of another embodiment of the illuminated power receptacle according to an aspect of this invention using fiber cladding to provide illumination.

An exploded perspective view of another embodiment according to an aspect of the invention is shown in FIG. 6 with illuminated power receptacle 10a. Illuminated power receptacle 10a may utilize the receptacle base 40, receptacle cover 50, and TR mechanisms 70 and 72 of FIG. 2. However, the receptacle spacer 60a differs from receptacle spacer 60 of FIG. 2 in that the receptacle spacer 60 does not include LEDs mounted on the PCB. Instead, fiber cladding members 80 and 82 are disposed on the underside of receptacle cover 50 behind outlet members 14 and 16 to act as the source of illumination. Cladding members 80 and 82 are held in place by receptacle spacer 60a with TR mechanisms 70 and 75 mounted thereon and include openings aligned with the openings in outlet members 14 and 16 to accept prongs of the plugs inserted therein. Electrical leads 81 and 83 are each connected at a first end to side-fired LEDs 84 and 85, respectively, and at their second ends to a power source on PCB 61a by connectors 86 and 87. The side-fired LED's may be integrated into the fiber cladding, as in known in the art.

Figures 7A, 7B:
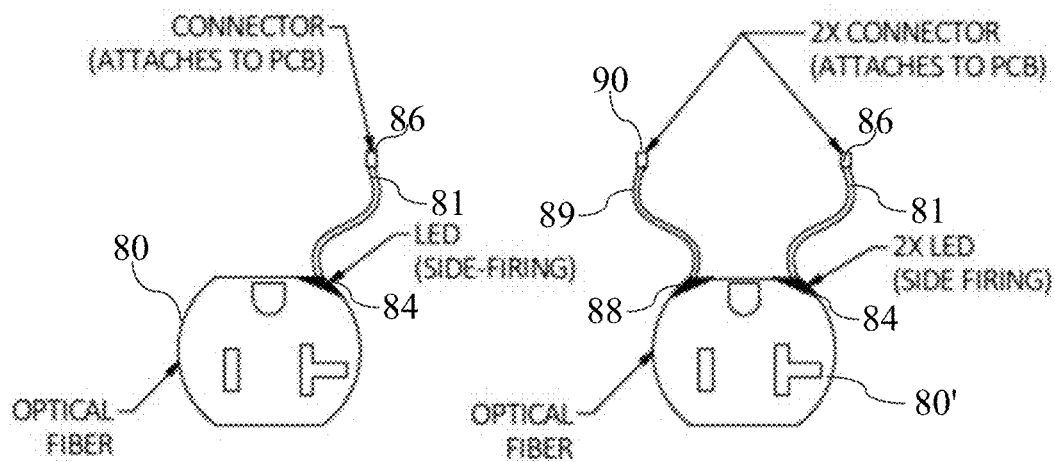
FIG. 7A shows a front elevational view of the fiber cladding of FIG. 6.
FIG. 7B shows a front elevational view of another configuration of the fiber cladding of FIG. 6.

Fiber cladding member 80 is shown in an enlarged view in FIG. 7A. An alternative embodiment of cladding member 80 is shown in FIG. 7B, as fiber cladding member 80' which, in addition to side fired LED 84, includes a second side-fired LED 88 to provide increased illumination. Side-fired LED 88 may be connected to electrical lead 89 at a first end and the second end of lead 89 may be connected to a power source on PCB 61a, FIG. 6, by connector 90.

Figure 7C:
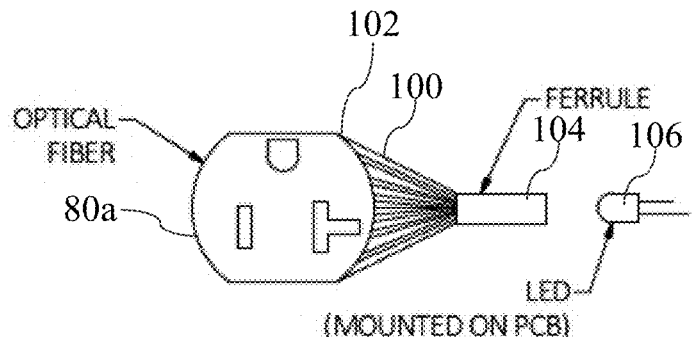
FIG. 7C shows a front elevational view of yet another configuration of the fiber cladding of FIG. 6.
Figure 7D:
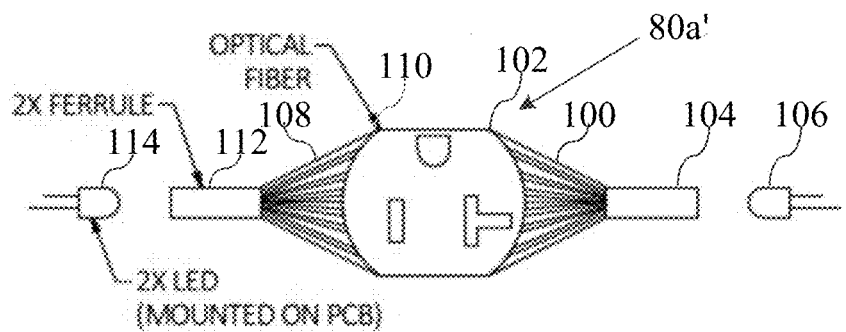
FIG. 7D shows a front elevational view of a further configuration of the fiber cladding of FIG. 6.

An alternative configuration of fiber cladding 80 is shown in FIG. 7C as fiber cladding 80a. Instead of using side-fired LED(s) integrated into the cladding, a plurality of optical fibers 100 may be connected along a side 102 of fiber cladding 80a at a first end and at a second end the plurality of fibers may be aggregated by a ferrule 104. The ferrule 104 may then be interconnected to an LED 106 mounted on PCB 61a. If additional illumination is desired, fiber cladding 80a', FIG. 7B, may be used. This configuration includes a second set of optical fibers 108 connected along a second side 110 of fiber cladding 80a', opposite first side 102. The plurality of optical fibers 108 are aggregated at a second end by ferrule 112 and interconnected to an LED 114 also mounted on PCB 61a.

Figure 8:
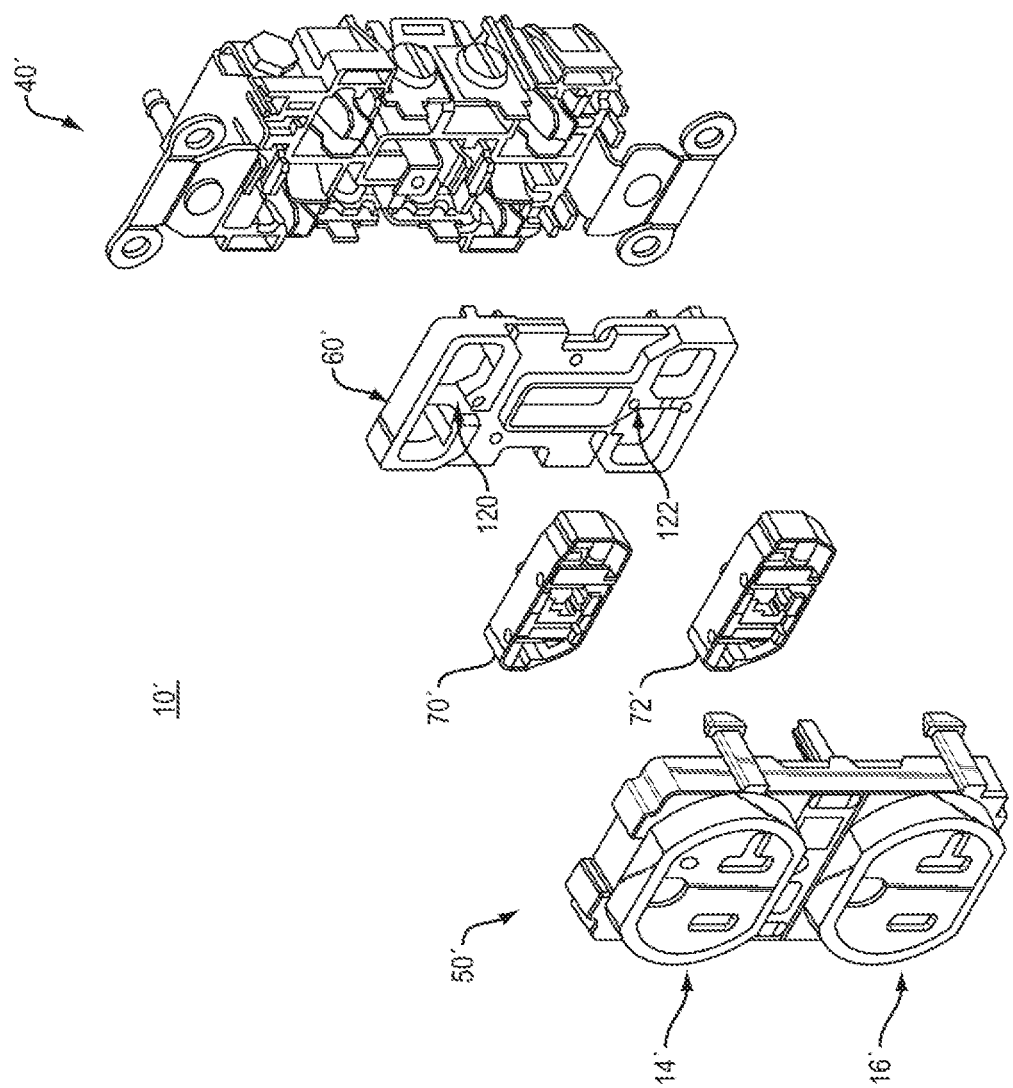
FIG. 8 shows an exploded perspective view of another embodiment of the illuminated power receptacle described herein.
Figure 9:
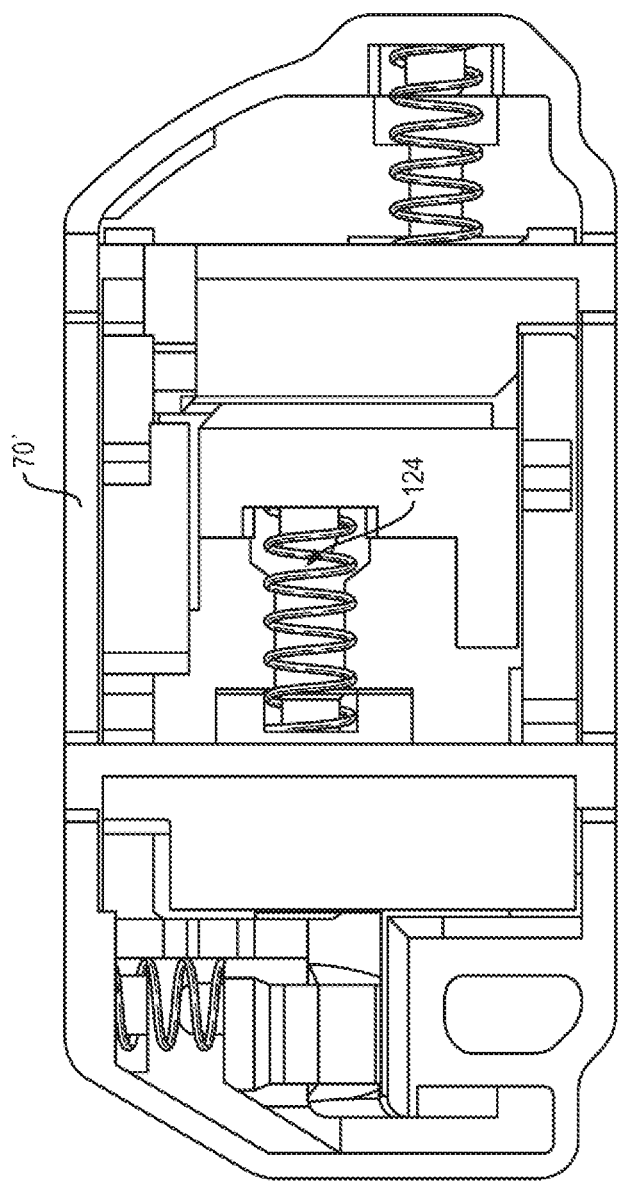
FIG. 9 shows an enlarged top plan view of a tamper resistant mechanism depicted in FIG. 8.

An alternative embodiment of receptacle 10, FIG. 2A, is shown in FIGS. 8 and 9, as receptacle 10'. In this embodiment, instead of using side fired LEDs (62a-e) on PCB 61 of receptacle spacer 60, receptacle 10' may include LEDs 120 and 122 to illuminate outlet members 14 and 16, respectively. LEDs 120 and 122 may be surface mount or leaded through-hole LEDs, which are configured to illuminate outlets 14 and 16 directly rather than indirectly illuminating them through the translucent spacer 60, as is the case with the embodiment of FIG. 2A. TR mechanism 70' is shown in an enlarged view in FIG. 9 to include an opening 124, which is in alignment with LED 120 on receptacle spacer 60' and outlet member 14' on receptacle cover 50'. This allows the LED light to pass from receptacle spacer 60' through TR mechanism 70' to directly illuminate outlet member 14'. TR mechanism 72' may be similarly configured so it is not described in detail herein.

Figure 10:
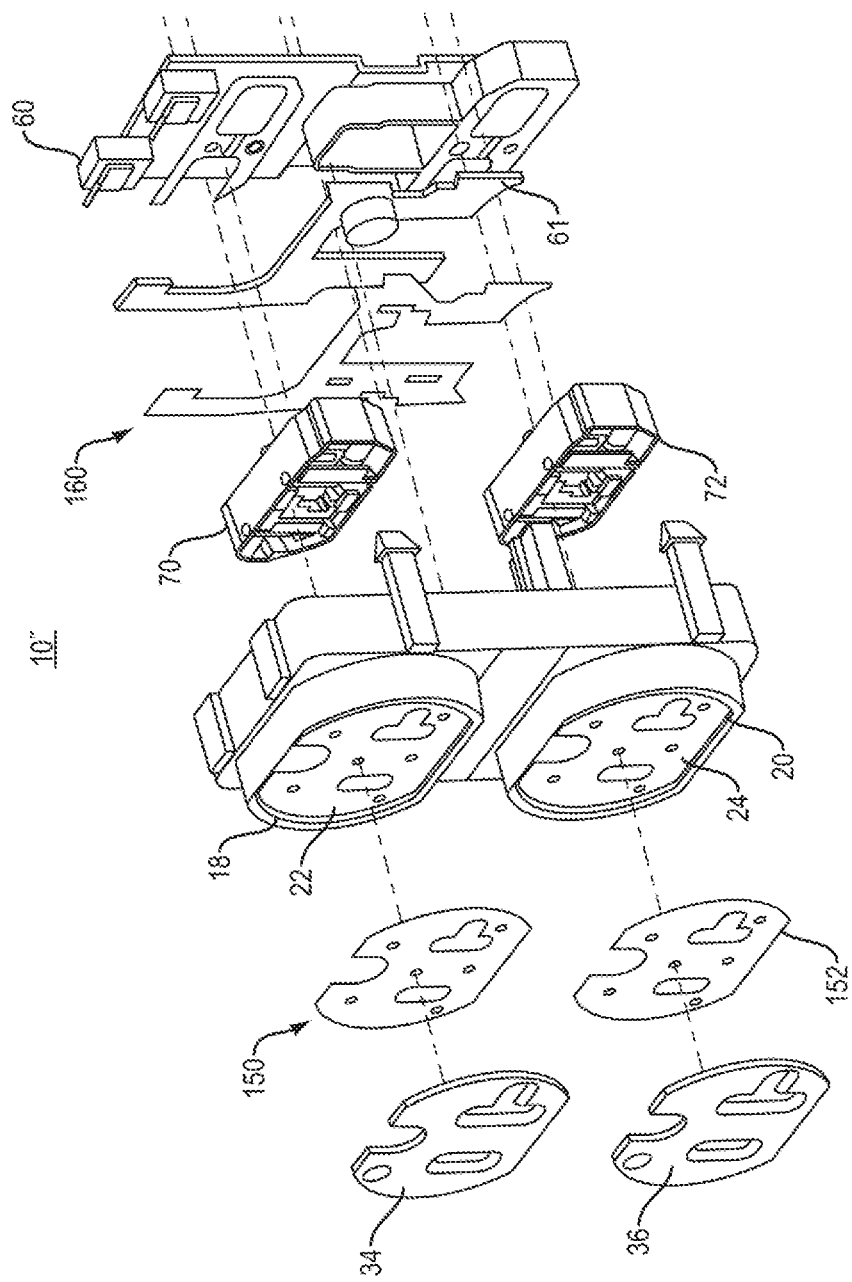
FIG. 10 shows an exploded perspective view of an alternative embodiment of the illuminated power receptacle of FIG. 2A.

In FIG. 10, there is shown an exploded perspective view of an alternative embodiment of the illuminated power receptacle 10 of FIG. 2A. Here, illuminated power receptacle 10" is configured similarly to illuminated power receptacle 10 with a few exceptions. Like components are labelled with the same reference numbers and components that have changed are labelled with new reference numbers. On outlet faces 22 and 24 of receptacle cover 50 are disposed opaque spacers 150 and 152, respectively, which may be formed of mylar. On top of opaque spacers 150 and 152 are opaque inserts 34 and 36, respectively. The opaque spacers 150 and 152, which may be black in color, may be added to improve light blocking capability. With just the opaque inserts 34 and 36, which often are red in color, the light blocking capability might not be sufficient for certain applications. Alternatively, the opaque spacers 150 and 152 may be removed and the rear side (i.e. facing inward of the illuminated power receptacle 10") of the opaque inserts 34 and 36 may be painted to enhance the light blocking capability. While darker paint will be the most effective, even white paint will increase the light blocking capability and may be more aesthetically pleasing.

An additional change with this embodiment is that receptacle spacer 60 includes an opaque insulating layer 160, which may be made of black mylar and disposed on the surface of PCB 61 of receptacle spacer 60. Alternatively, the opaque insulating layer 160 may comprise a thicker spacer component made of a molded nylon material, for example, instead of the flatter mylar material. In either case, he opaque insulating layer 160 covers side-fired LEDs 63a-63e to provide light insulation to insure the light generated is primarily transmitted through receptacle spacer 60. Any light generated which propagates in the direction of outlet faces 22 and 24 will be blocked by opaque insulating layer 160. Thus, the only light leaving receptacle cover 50 will be through rims 18 and 20 outlet members 14 and 16, respectively.

Figure 11:
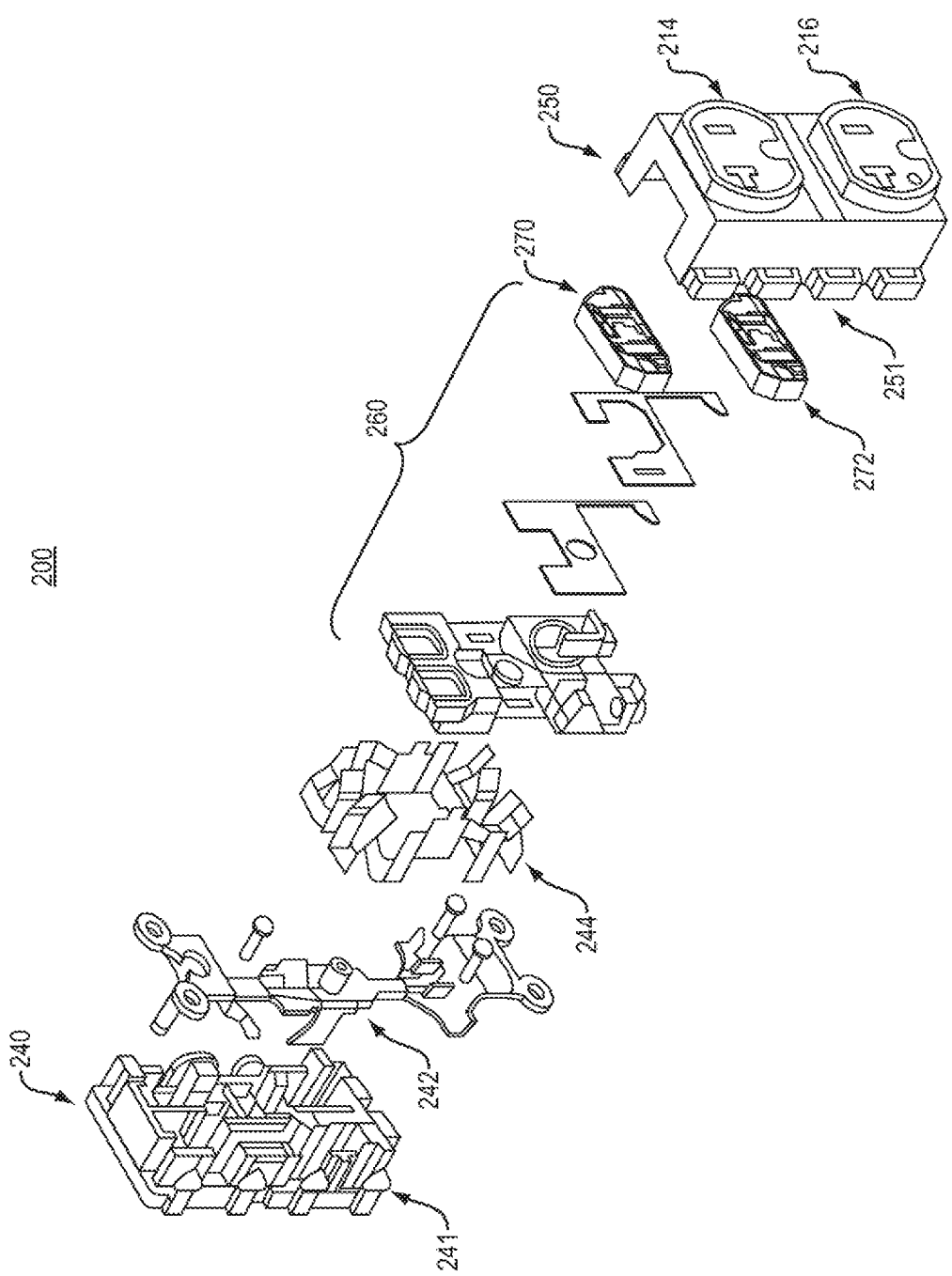
FIG. 11 shows an exploded perspective view of an alternative embodiment of the illuminated power receptacle of FIG. 2A.
Figure 12:
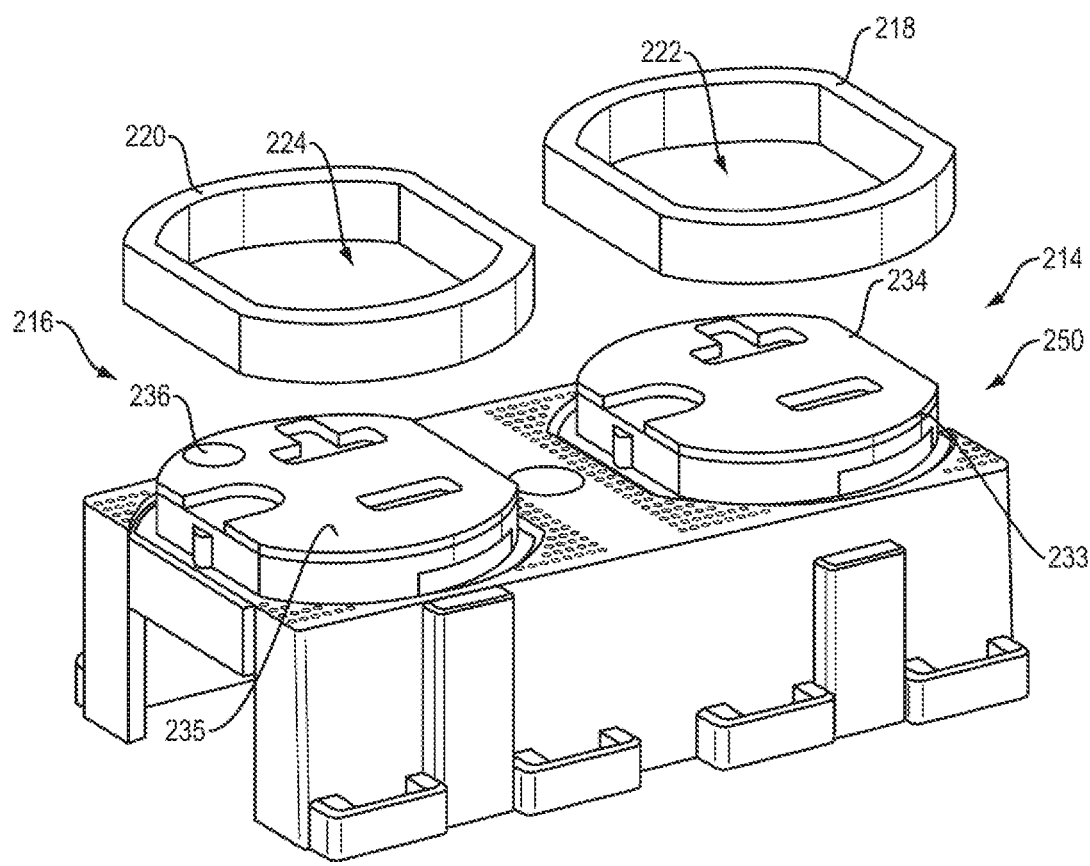
FIG. 12 shows a perspective view of the receptacle cover shown in FIG. 11.

An alternative receptacle design to increase robustness is depicted in FIGS. 11-15. Referring to FIG. 11, receptacle 200 can be seen in an exploded view to include a receptacle base 240 configured to be received within an electrical box (not shown) mounted to the framing within the building and connected thereto by yokes 242. Within receptacle base 240 there may also be included contact bridge 244 which electrically interconnects to the building power source on one side and to the outlets of receptacle 200. Receptacle cover 250 may include outlet members 214 and 216, and sandwiched between receptacle cover 250 and receptacle base 240 may be a receptacle spacer 260 and TR mechanisms 270 and 272. As with the above described embodiments, in this embodiment, the entire receptacle cover 250 and the entire receptacle spacer 260 may be fabricated from a translucent material, such as a clear polycarbonate material. Alternatively, in this embodiment and the others described above, a Sabic resin, e.g. Sabic LUX7632, that is not entirely transparent, but designed is designed to be diffusive with varying additives that add cloudy, translucent qualities may be used.

One structural difference with receptacle 200, as compared to the receptacles in the previous embodiments, is that a receptacle base 240 may include on each side a plurality of male protrusions 241, which engage with complementary female catches 251 on each side of receptacle cover 250 to secure the receptacle cover 250 to receptacle base 240 along with the components in between. In the other embodiments, the receptacle bases included female catches and the receptacle covers included male protrusions.

Figure 13:
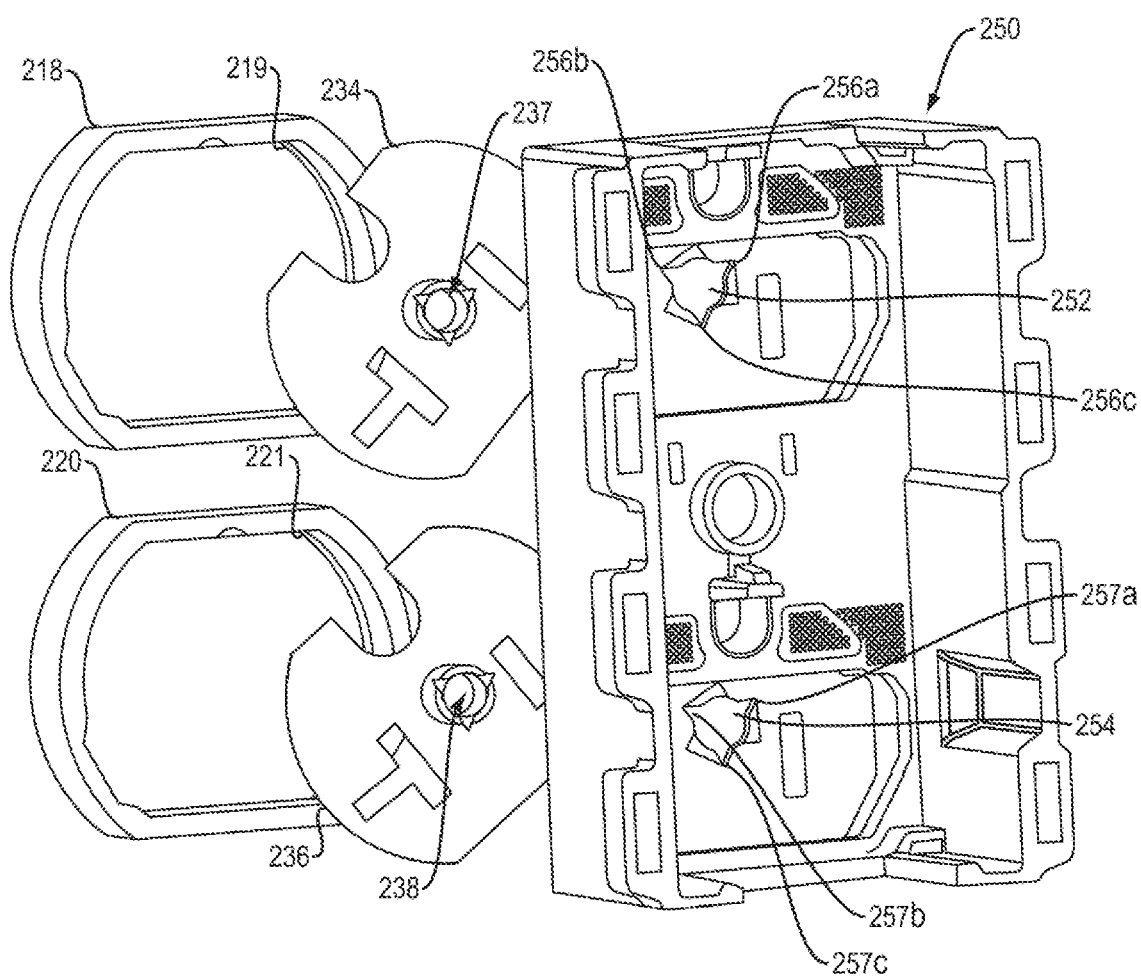
FIG. 13 shows an exploded perspective view from the rear of the receptacle cover shown in FIG. 12.
Figure 14:
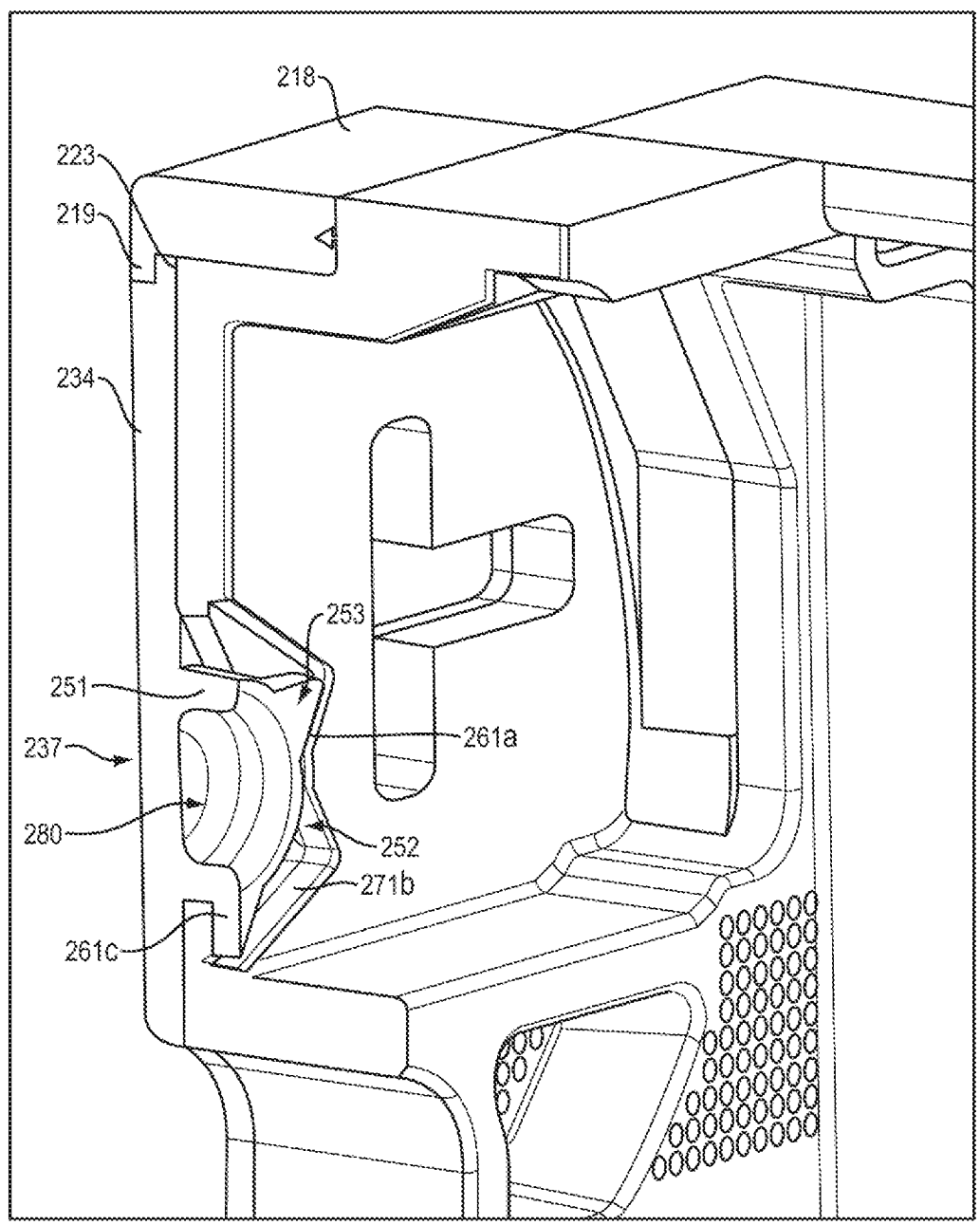
FIG. 14 shows perspective view of a cross-section of one outlet member of the receptacle cover shown in FIG. 12.

A more significant difference from the above embodiments is the design of outlet members 214 and 216. Referring to FIGS. 12-15, the differences are depicted. Outlet members 214 and 216 may include translucent rims 218 and 220, which surround the peripheries of outlet faces 222 and 224. Opaque inserts 234 and 236 may be disposed on outlet faces 222 and 224 (not visible due to the inserts) and the outer surfaces of the opaque inserts may be substantially flush with the top edges of the outlet rims 218 and 220. Around the periphery of each opaque insert 234 and 236 may be included a lip 233 and 235, respectively, which may have a lip surface below that of the surface of the inserts. As can be seen in FIG. 13, the underside of translucent rims 218 and 220 may include flanges 219 and 221, respectively, which may extend inwardly from and encircle the top surfaces of the rims. As can be seen in FIG. 14, when opaque insert 234 is seated on outlet face 222 lip 233 may engage with complementary flange 219 of outlet rim 218 to seal the insert in place. Although not depicted, opaque insert 236 and outlet rim 220 may be designed and interconnected in the same way.

Referring to FIGS. 13 and 14, Opaque inserts 234 and 236 may also include bezel members 237 and 238, respectively, which extend outwardly from the back surfaces of the inserts and may be used to secure the opaque inserts to the faces 222 and 224 of the receptacle cover 250. Bezel member 237 is shown in FIG. 14 to include a cylindrical protrusion 251 extending from the back surface of opaque insert 234, which protrusion may terminate in a substantially flat feature 253 with one or more tab members extending out from the periphery of the protrusion. In this case the feature 253 is triangular in shape and the tips of which form three triangular shaped tabs. While not shown in detail here, bezel member 238 may be similarly configured. To secure the opaque inserts to the faces 222 and 224 of the receptacle cover 250, bezel members 237 and 238 may be inserted through apertures 252 and 254 in insert faces 222 and 224, respectively, the apertures may be shaped to receive the protrusion 251 and the tab like feature 253.

In this embodiment, apertures 252 and 254 may be cylindrical in shape and have three triangular shaped openings equally spaced about their cylindrically shaped peripheries. Triangular shaped openings 256*a*, 256*b*, and 256*c* may be spaced about the periphery of aperture 252 and triangular shaped openings 257*a*, 257*b*, and 257*c* may be spaced about the periphery of aperture 254. By rotating the opaque inserts 234 and 236 about axes extending through the centers of apertures 252 and 254 until the tips of the flat triangular shaped features of the bezel members are aligned with the similarly sized, triangular shaped openings spaced about the periphery of apertures, the bezel members can pass through the apertures.

Once passed through the apertures, the opaque inserts 234 and 236 may be rotated so that the tips/tabs of the flat triangular shaped features are out of alignment with the triangular shaped openings and are in contact with the back surfaces of the insert faces in a pocket, thus preventing the tabs and the opaque inserts from being retracted back through the aperture. This is shown with respect to bezel member 237 in FIGS. 14 and 15 where triangular tips 261*a*, 261*b*, and 261*c* of the flat triangular shaped feature 253 are positioned in place in pockets 271*a*, 271*b*, and 271*c*.

Figure 15:
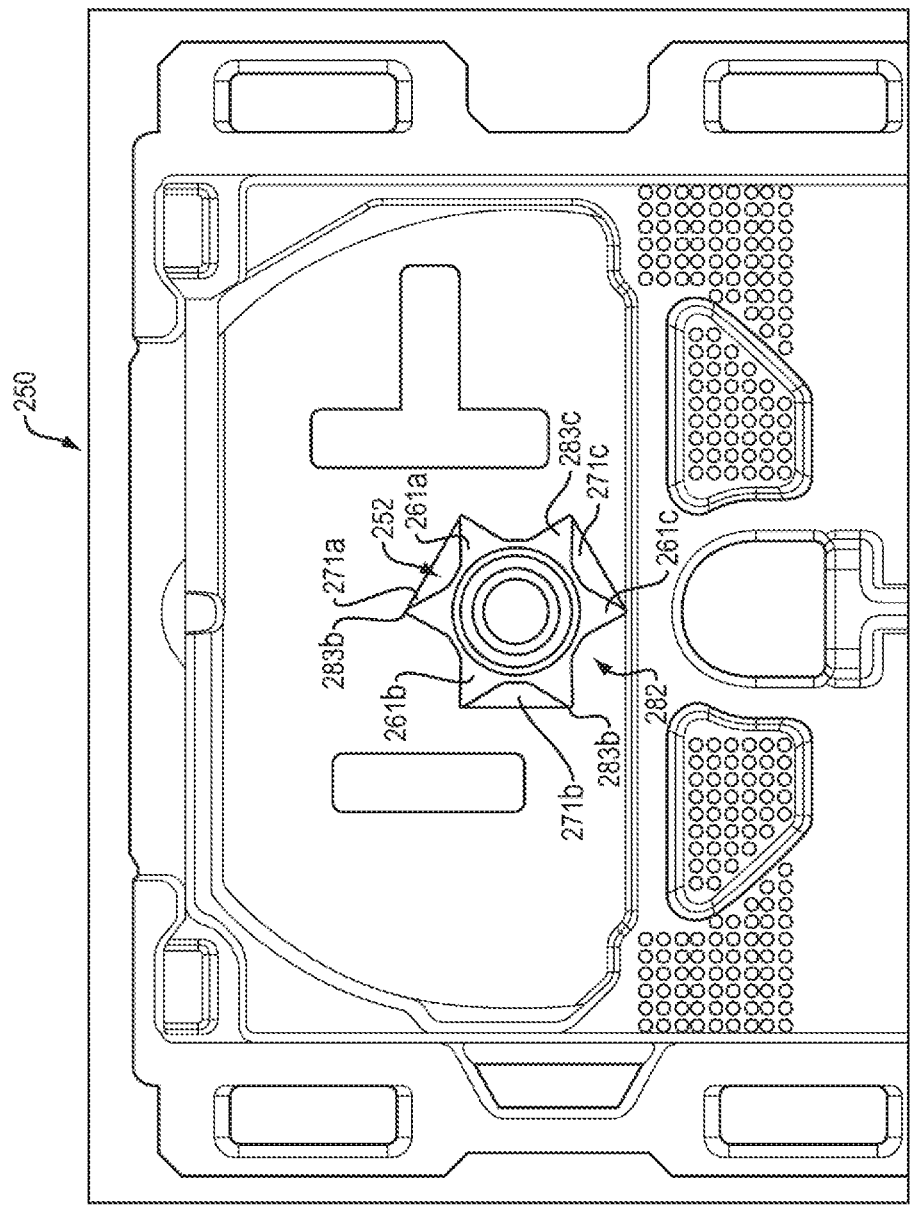
FIG. 15 shows a bottom plan view of the one outlet member of the receptacle cover shown in FIG. 14.

As seen in FIG. 14, cylindrical protrusion 251 extending from the back surface of opaque insert 234 may include a hollow interior space 280, which may receive a complementary bezel member 282, FIG. 15. Bezel member 282 includes tips/tabs 283*a*, 283*b*, and 283*c*, which may also be received into and positioned in place in pockets 271*a*, 271*b*, and 271*c* when the cylindrical protrusion (not shown) of bezel member 282 is fully inserted into hollow interior space 280 of bezel member 237. Bezel members 237 and 282 may be ultrasonically welded or otherwise adhered together and to receptacle cover 250 to further secure the insert in place. It should be noted that the bezel members may be formed of a polycarbonate material, a thermoplastic material or of Sabic resin. It should be further noted that the cylindrical protrusion and triangular tip features of the bezel members may take on various geometric shapes. Of course, the geometric shapes of apertures 252 and 254 would need to be modified accordingly. For example, the bezel member protrusions may be triangular in shape and the tips may be rounded or square shaped.

It will be apparent to those skilled in the art that the above described illuminated power receptacles may be configured to have ground fault circuit interrupter (GFCI) functionality, which may be used to detect and provide an indication when there is a ground fault. In addition, the illuminated power receptacles may be configured to control or alter the LED light output so that it can be caused to be intermittently illuminated (i.e. flashed/strobed) or to change color, for example. The altered light output may be used to indicate that a particular condition (e.g. a ground fault or other condition) has been detected. This functionality may be included by incorporating the appropriate components as well as a controller functionality to control the LED(s), depending on the condition(s) detected.

While the disclosure has been described in terms of exemplary embodiments, those skilled in the art will recognize that the disclosure can be practiced with modifications in the spirit and scope of the appended claims. These examples are merely illustrative and are not meant to be an exhaustive list of all possible designs, embodiments, applications or modifications of the disclosure.

We claim:

1. An illuminated power receptacle comprising:
   a receptacle base configured to be received within an electrical box, said receptacle base including electrically conductive terminals for receiving electrical power from a power source and at least one set of receptacle contacts connected to the electrically conductive terminals for receiving a plug to electrically connect to the power source, each set of receptacle contacts having at least two openings for receiving a respective prong of said plug;
   a receptacle cover mounted on the receptacle base and including an outlet member corresponding to each of the at least one set of receptacle contacts, each outlet member including an outlet face comprising an opaque material and having an outer periphery; wherein each outlet face also includes at least two openings aligned with the at least two openings of the corresponding set of receptacle contacts, the at least two openings in each outlet face configured to receive and guide a respective prong of said plug into the set of at least two openings of the corresponding set of receptacle contacts; each outlet member further includes an outlet rim made of a translucent material and disposed about the outer periphery of the outlet face; and
   a light source disposed between the receptacle base and the receptacle cover and operatively coupled to said electrical power source for generating light directed at each outlet member; wherein the light is transmitted through each outlet rim out of the illuminated power receptacle while the light transmitted toward each outlet face is substantially blocked by the opaque material.

2. The illuminated power receptacle of claim 1 wherein the opaque material comprises an opaque film disposed on the outlet face.

3. The illuminated power receptacle of claim 1 wherein each outlet face is formed of an opaque material.

4. The illuminated power receptacle of claim 1 wherein the light source includes a layer of fiber cladding disposed on a back surface of the receptacle cover.

5. The illuminated power receptacle of claim 1 wherein for each outlet member, the outlet rim is disposed entirely about the outer periphery of the outlet face.

6. The illuminated power receptacle of claim 5 wherein a surface of the opaque material is substantially flush with the outlet rim and wherein the opaque material occupies substantially all of the outlet face, excluding the at least two openings.

7. The illuminated power receptacle of claim 1 wherein the opaque material includes an indicia to indicate an application for the illuminated power receptacle.

8. The illuminated power receptacle of claim 7 wherein the indicia includes a color for the opaque material.

9. The illuminated power receptacle of claim 1 further including a detector for detecting a condition of the receptacle and a device to alter the light transmitted from the output source based on the detected condition.

10. The illuminated power receptacle of claim 9 wherein the device to alter the light transmitted based on the detected condition causes the light to be altered by one of causing it to change color or to be intermittently illuminated.

11. The illuminated power receptacle of claim 9 wherein the detected condition is a ground fault.

12. The illuminated power receptacle of claim 1 wherein the opaque material of each outlet face comprises an opaque insert affixed to each outlet face.

13. The illuminated power receptacle of claim 12 further including an opaque spacer layer disposed on each outlet face below the opaque insert.

14. The illuminated power receptacle of claim 12 wherein each opaque insert includes a bezel member protruding from a back surface and each outlet face includes an aperture through which the bezel member is inserted to secure the opaque insert to the outlet face.

15. The illuminated power receptacle of claim 14 wherein each bezel member includes a protrusion affixed at a first end to the back surface of the opaque insert and at least one tab member at a second end of the protrusion and extending out from a periphery of the protrusion and wherein each aperture includes at least one opening about its periphery shaped to conform to the shape of the at least one tab member to allow the at least one tab member to pass through the aperture when the bezel member is inserted through the aperture at first rotational position about an axis of the aperture.

16. The illuminated power receptacle of claim 15 wherein each outlet face includes a back surface with at least one pocket for securing the at least one tab member when each opaque insert member has been inserted through the aperture and rotated to a second rotational position about the axis of the aperture, preventing the at least one tab member from being retracted through the aperture.

17. The illuminated power receptacle of claim 15 wherein the protrusion of each bezel member is cylindrical in shape and the at least one tab member is triangular in shape and wherein the aperture is cylindrical in shape and the at least one opening about the periphery of the cylindrical aperture is triangular in shape.

18. The illuminated power receptacle of claim 15 wherein the second end of the protrusion of each bezel member includes an opening configured to receive a protrusion at a first end of a complementary bezel member when the protrusion of the complementary bezel member is inserted in the opening and wherein the complementary bezel member includes at a second end at least one tab member configured to be received in the at least one pocket.

19. The illuminated power receptacle of claim 18 wherein each bezel member and each complementary bezel member comprise one of a polycarbonate material, a thermoplastic material, or a Sabic resin.

20. The illuminated power receptacle of claim 18 wherein each bezel member is adhered to the complementary bezel member and to the receptacle cover.

21. The illuminated power receptacle of claim 20 wherein each bezel member is adhered to the complementary bezel member and to the receptacle cover using ultrasonic welding.

22. The illuminated power receptacle of claim 1 further including a receptacle spacer disposed between the receptacle base and the receptacle cover, wherein the light source is disposed on the receptacle spacer.

23. The illuminated power receptacle of claim 22 further including an opaque insulating layer overlying the receptacle spacer and covering the light emitting diodes.

24. The illuminated power receptacle of claim 22 wherein the receptacle cover and the receptacle spacer comprise one of a polycarbonate material, a thermoplastic material, or a Sabic resin.

25. The illuminated power receptacle of claim 24 wherein the receptacle cover includes a back surface having texture to diffuse the light transmitted from the light source.

26. The illuminated power receptacle of claim 22 wherein the receptacle spacer includes a tamper resistant (TR) mechanism for each outlet member.

27. The illuminated power receptacle of claim 26 wherein the light source comprises a light emitting diode associated with each outlet member, and wherein each light emitting diode is oriented to direct light through an opening in the TR mechanism corresponding to the outlet member associated with the light emitting diode.

28. The illuminated power receptacle of claim 26 wherein each TR mechanism is formed of one of a translucent, semi-translucent, or opaque material.

29. The illuminated power receptacle of claim 22 wherein at least a portion of the receptacle spacer proximate each outlet member is formed of a translucent material and wherein the light source is directed into the portion of the receptacle spacer formed of translucent material to illuminate the translucent material of the receptacle spacer and to couple the light illuminating the receptacle spacer to each outlet member.

30. The illuminated power receptacle of claim 29, wherein the portion of the receptacle spacer formed of translucent material proximate each outlet member includes a first surface substantially parallel to a surface of each outlet member, and wherein the portion of the receptacle spacer formed of translucent material includes a second surface substantially orthogonal to the first surface.

31. The illuminated power receptacle of claim 30 wherein the light source comprises at least one light emitting diode directed into the second surface of the portion of the receptacle spacer formed of translucent material.

32. The illuminated power receptacle of claim 31 wherein the light emitting diode is mounted on a printed circuit board (PCB) disposed on the receptacle spacer.

33. An illuminated power receptacle comprising:
a receptacle base configured to be received within an electrical box, said receptacle base including electrically conductive terminals for receiving electrical power from a power source and at least one set of receptacle contacts connected to the electrically conductive terminals for receiving a plug to electrically connect to the power source, each set of receptacle contacts having at least two openings for receiving a respective prong of said plug;
a receptacle cover mounted on the receptacle base and including an outlet member corresponding to each of the at least one set of receptacle contacts, each outlet member being made of a translucent material and including an outlet face and an outlet rim disposed about and projecting from the outlet face; wherein each outlet face includes at least two openings aligned with the at least two openings of the corresponding set of receptacle contacts, the at least two openings in each outlet face configured to receive and guide a respective prong of said plug into the set of at least two openings of the corresponding set of receptacle contacts;
an opaque insert disposed on the outlet face and adjacent the outlet rim of each outlet member, each opaque insert including at least two openings aligned with the at least two openings of a corresponding outlet member; and
a light source disposed between the receptacle base and the receptacle cover and operatively coupled to said electrical power source for generating light directed at each outlet member; wherein the light is transmitted through each outlet rim out of the illuminated power receptacle while the light transmitted through each outlet face in a region of the opaque insert is substantially blocked.

34. An illuminated power receptacle comprising:
a receptacle base configured to be received within an electrical box, said receptacle base including electrically conductive terminals for receiving electrical power from a power source and at least one set of receptacle contacts connected to the electrically conductive terminals for receiving a plug to electrically connect to the power source, each set of receptacle contacts having at least two openings for receiving a respective prong of said plug;

a receptacle cover mounted on the receptacle base and including an outlet member corresponding to each of the at least one set of receptacle contacts, each outlet member being formed of an opaque material and including an outlet face having an outer periphery; wherein each outlet face includes at least two openings aligned with the at least two openings of the corresponding set of receptacle contacts, the at least two openings in each outlet face configured to receive and guide a respective prong of said plug into the set of at least two openings of the corresponding set of receptacle contacts; each outlet member further includes an outlet rim made of a translucent material and disposed about the periphery of the outlet face; and a light source disposed between the receptacle base and the receptacle cover and operatively coupled to said electrical power source for generating light directed at each outlet member; wherein the light is transmitted through each outlet rim out of the illuminated power receptacle while the light transmitted toward each outlet face is substantially blocked by the opaque material.

* * * * *